United States Patent [19]

Fukuoka

[11] Patent Number: 5,574,608
[45] Date of Patent: Nov. 12, 1996

[54] BRUSHLESS MOTOR LOCK DETECTION APPARATUS

[75] Inventor: Toshiaki Fukuoka, Yonago, Japan

[73] Assignee: Matsushita Electric Industrial Co., Ltd., Osaka, Japan

[21] Appl. No.: 316,549

[22] Filed: Sep. 30, 1994

[30] Foreign Application Priority Data

Oct. 1, 1993 [JP] Japan .................................. 5-246611

[51] Int. Cl.$^6$ .................................................. H02H 5/04
[52] U.S. Cl. ............................... 361/23; 361/31; 318/798
[58] Field of Search ................................. 361/23, 28, 29, 361/30, 31; 318/68, 69, 138, 439, 632, 638, 647, 652, 653, 798, 806, 823

[56] References Cited

U.S. PATENT DOCUMENTS 3,839,661 10/1974 Wada ........................................ 318/138
4,030,005 6/1977 Doemen .................................... 318/439

FOREIGN PATENT DOCUMENTS

48-91513  11/1973  Japan .
50-144022 11/1975  Japan .
2-160505  6/1990  Japan .

*Primary Examiner*—Jeffrey A. Gaffin
*Assistant Examiner*—Ronald W. Leja
*Attorney, Agent, or Firm*—Ratner & Prestia

[57] ABSTRACT

A brushless motor lock detection apparatus for detecting a locked condition of a rotor of a brushless motor includes a pulse generator for generating pulses synchronized to the rotation of the rotor, a capacitor for charging a current during motor being locked, a control circuit for monitoring the charge in the capacitor, and a flip-flop circuit. The control circuit produces a lock detection signal when the charge in the capacitor reaches a predetermined level, and cuts off power to the motor. After a while, the control circuit starts to supply power to the motor. The flip-flop circuit produces a locked state signal which starts in response to the lock detection signal and ends in response to the pulse.

11 Claims, 6 Drawing Sheets

BRUSHLESS MOTOR LOCK DETECTION APPARATUS

BACKGROUND OF THE INVENTION

1. Field of the Invention

The present invention relates to a brushless motor lock detection apparatus, and particularly to a means for notifying an external component when the motor stops turning for any reason.

2. Description of the Prior Art

The good control characteristics of recent compact DC motors have been confirmed in the audio, information processing, and various industrial fields, leading to the rapid development of applications for such motors. Brushless motors in particular have a long service life because they have no contact parts such as brushes and commutators. Industrial applications for brushless motors, for which reliability is a primary consideration, have therefore expanded rapidly.

An example of one such application is the axial-flow fan, the drive method of which has changed in recent years from AC to DC motors. DC axial-flow fans using a brushless motor are now common.

Demand for extremely high reliability DC axial-flow fans has risen steadily as the packaging density of industrial machinery, particularly computer equipment and other electronics, has increased. Demand is specifically high for fans that can prevent the motor coil from seizing when the motor stops for some external reason; can issue an alarm to the main unit of which the fan is part to prevent an accident; and can automatically reset and resume operation when the cause of the motor stoppage is removed.

Figure 5:
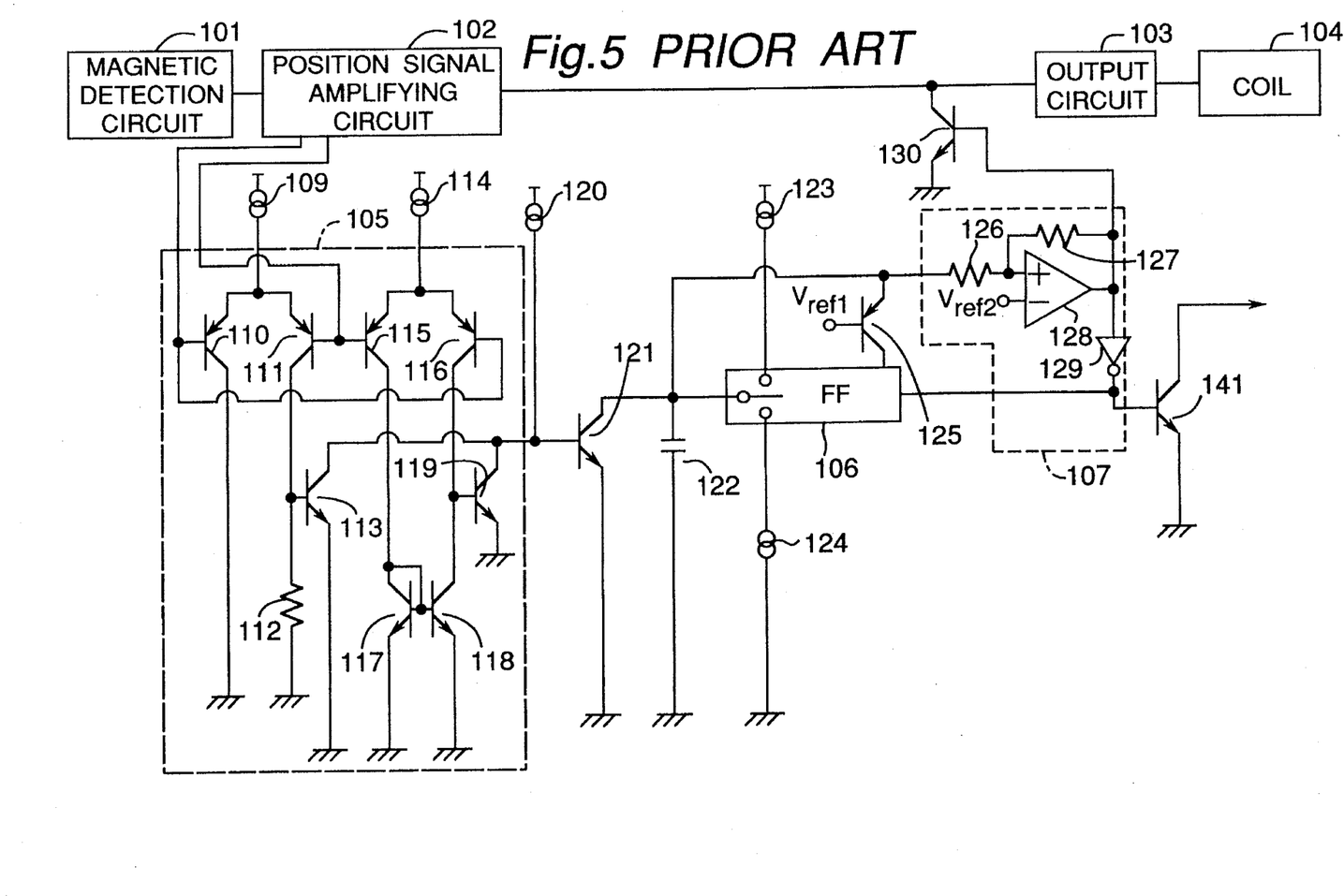
FIG. 5 is a circuit diagram of a conventional apparatus.

The construction of a conventional drive motor for an axial flow fan is shown in FIG. 5, and comprises a magnetic detection circuit 101, position signal amplifying circuit 102, output circuit 103, and coil 104. With this configuration, if the motor is stopped by some external force or is forced to operate at a low speed due to an overload condition, the coil 104 will typically seize from the overcurrent, and the motor will cease to function. Problems such as this are prevented by interrupting the output circuit 103 by means of the circuitry described below, thus effectively blocking the overcurrent flow. More specifically, the rotation pulse generation circuit 105 comprises transistors 110 and 111 forming a differential amplifier of which the load is resistance 112; transistors 115 and 116 forming another differential amplifier of which the active load is transistors 117 and 118, which form a current mirror circuit; and transistors 113 and 119, which share the collector to which the signal from resistance 112 and transistor 118 is input. The rotation pulse generation circuit 105 emits a pulse output from the common collector synchronized to the rotational position of the rotor.

The flip-flop circuit 106 receives input from the integration control transistor 125 and inverter 129, and connects the charge-storing capacitor 122 to the constant current source 123 to charge, or to the other constant current source 124 to discharge, the capacitor 122.

The integration circuit 107 comprises resistances 126 and 127, which determine the hysteresis characteristic, comparator 128, and inverter 129. When the rotor locks and the potential of the capacitor 122 rises to potential A in FIG. 6(a), locked state protection transistor 130 is driven to interrupt the output circuit 103, and transistor 130 continues to suppress the output circuit 103 until the potential drops to C. During normal operation, the discharge transistor 121 discharges the capacitor 122 according to the pulse output from the rotation pulse generation circuit 105. When the motor locks, however, the integration circuit 107 outputs to the locked notification transistor 141, which then outputs a HIGH signal while the motor is locked.

Power is supplied from the constant current sources 109, 114, and 120.

The operation of this apparatus at this time is described below with reference to FIG. 6.

Figure 6A:
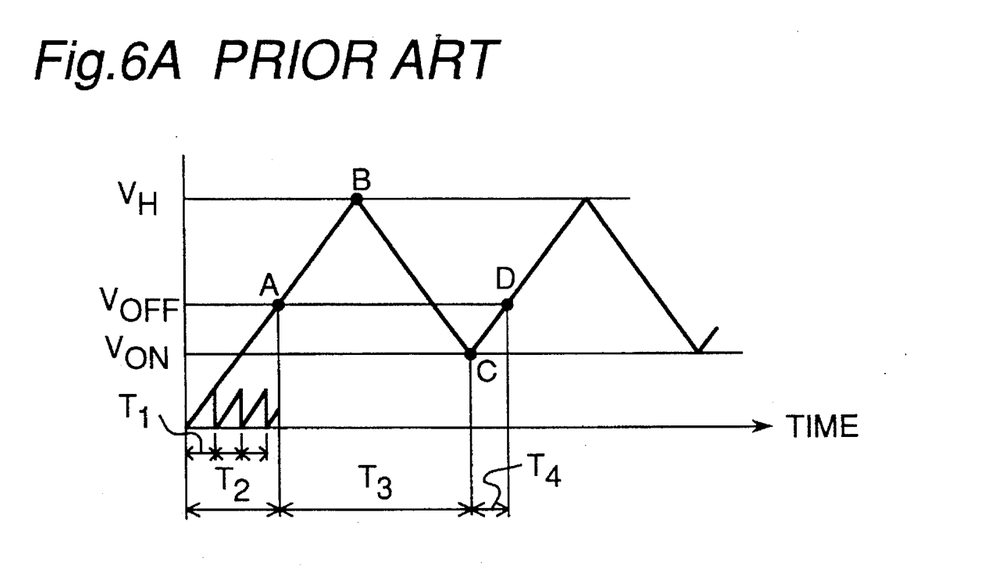
FIGS. 6A and 6B are wave form diagrams of the output signals obtained from the apparatus in FIG. 5.

The charge and discharge states of the capacitor 122 are shown in FIG. 6(a). The rotation pulse signal is output at a regular interval of time T1 during normal operation, and the potential of the capacitor 122 does not reach the potential $V_{OFF}$ at which the output circuit 103 is interrupted. The motor therefore continues turning without stopping.

If for some external reason the motor stops, however, the potential of the capacitor 122 rises to point A. When the capacitor potential is equal to potential A, the integration circuit 107 operates to interrupt the output circuit 103 by means of the locked state protection transistor 130. If the capacitor potential continues to rise and reaches B, i.e., if the potential rises to $V_H = V_{ref1} + V_{BE}$ ($V_{BE}$ is base-emitter voltage of transistor 125), the integration control transistor 125 operates, causing the contacts of the flip-flop circuit 106 to switch to the constant current source 124 to discharge the capacitor 122. The potential therefore drops to potential C. The integration circuit 107 thus works again, activating the output circuit 103 through the locked state protection transistor 130, and switching the flip-flop circuit 106 to the constant current source 123 to charge the capacitor 122. This causes the capacitor potential to rise again, and when the potential reaches point D (=A), the operation described above when the potential reaches A is repeated.

This on/off cycling of the motor during periods T3 and T4 continues until the external cause of motor stoppage is removed. If the external cause is removed during period T4, the motor is driven and the rotation pulse is emitted. This pulse drives the discharge transistor 121 to discharge the capacitor 122 and reset the normal operating mode.

Figure 6B:
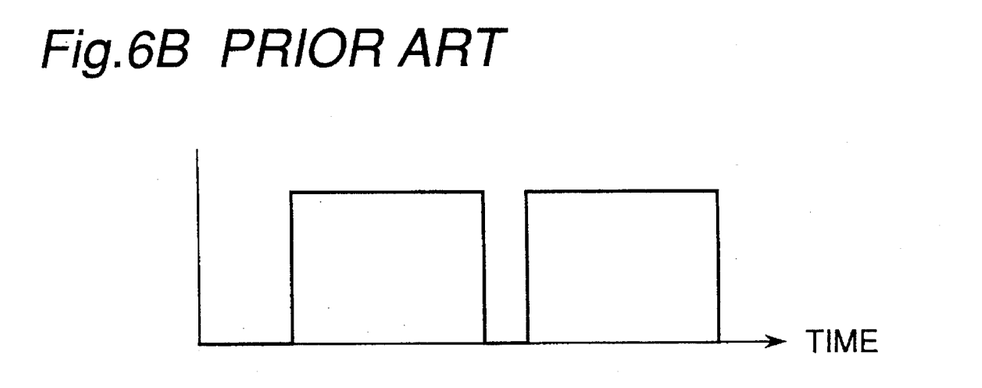

The diagram in FIG. 6(b) illustrates the operation of the locked notification transistor 141 relative to the potential levels shown in FIG. 6(a). The locked notification transistor 141 outputs a HIGH signal while the rotor is locked and the locked state protection circuit interrupts the output circuit 103, and outputs a LOW signal when the locked state protection circuit releases the output circuit 103.

As described with FIG. 6(b), a HIGH signal is output when the locked state protection circuit is active, and a LOW level signal is output during period T4 when the reset pulse from the integration circuit 107 is output, but this output signal processing is complex. With respect to this problem, the present inventors proposed in Japanese patent application 2-160505 a means whereby only a HIGH (or LOW) level signal is output once the time the locked state protection circuit is activated until the cause of motor locking is remedied, thus simplifying output signal processing.

However, in addition to the method described above for emitting an alarm to an external device when the motor stops for some external reason, it is also possible to output an FG signal while the motor is turning, and not output the FG signal when the motor stops.

SUMMARY OF THE INVENTION

So that the present invention can easily select and switch to the more appropriate of these two methods, two types of signals are obtained from the rotation pulse generation circuit 105, and selectively used by the output circuit.

More specifically, according to the present invention, a brushless motor lock detection apparatus for detecting a locked condition of a rotor of a brushless motor, said apparatus comprises: pulse generating means for generating pulses synchronized to the rotation of said rotor; an integration circuit for charging a current during motor being locked; first integration control means for producing a first mode control signal when said integration circuit is charged to a first predetermined level ($V_H=V_{ref1}+V_{BE}$); second integration control means having a hysteresis characteristics for producing a current interruption signal when said integration circuit is charged to a second predetermined level ($V_{OFF}=V_{ref2}$) which is less than said first predetermined level, and also for producing a second mode control signal when said integration circuit is discharged to a third predetermined level ($V_{ON}$) which is less than said second predetermined level, said second mode control signal being used for a current supply signal; mode selection means for selectively setting either one of a charge mode for supplying a charge current to said integration circuit, and a discharge mode for supplying a discharge current to said integration circuit, said discharge mode being established in response to said first mode control signal, and said charge mode being established in response to said second mode control signal; and lock detection means for producing a locked state signal which starts in response to said current interruption signal and ends in response to said pulse.

BRIEF DESCRIPTION OF THE DRAWINGS

The present invention will become more fully understood from the detailed description given below and the accompanying diagrams wherein.

DESCRIPTION OF PREFERRED EMBODIMENTS

The first embodiment of a brushless motor lock detection apparatus according to the invention is described below with reference to FIG. 1, a schematic diagram thereof.

Figure 1:
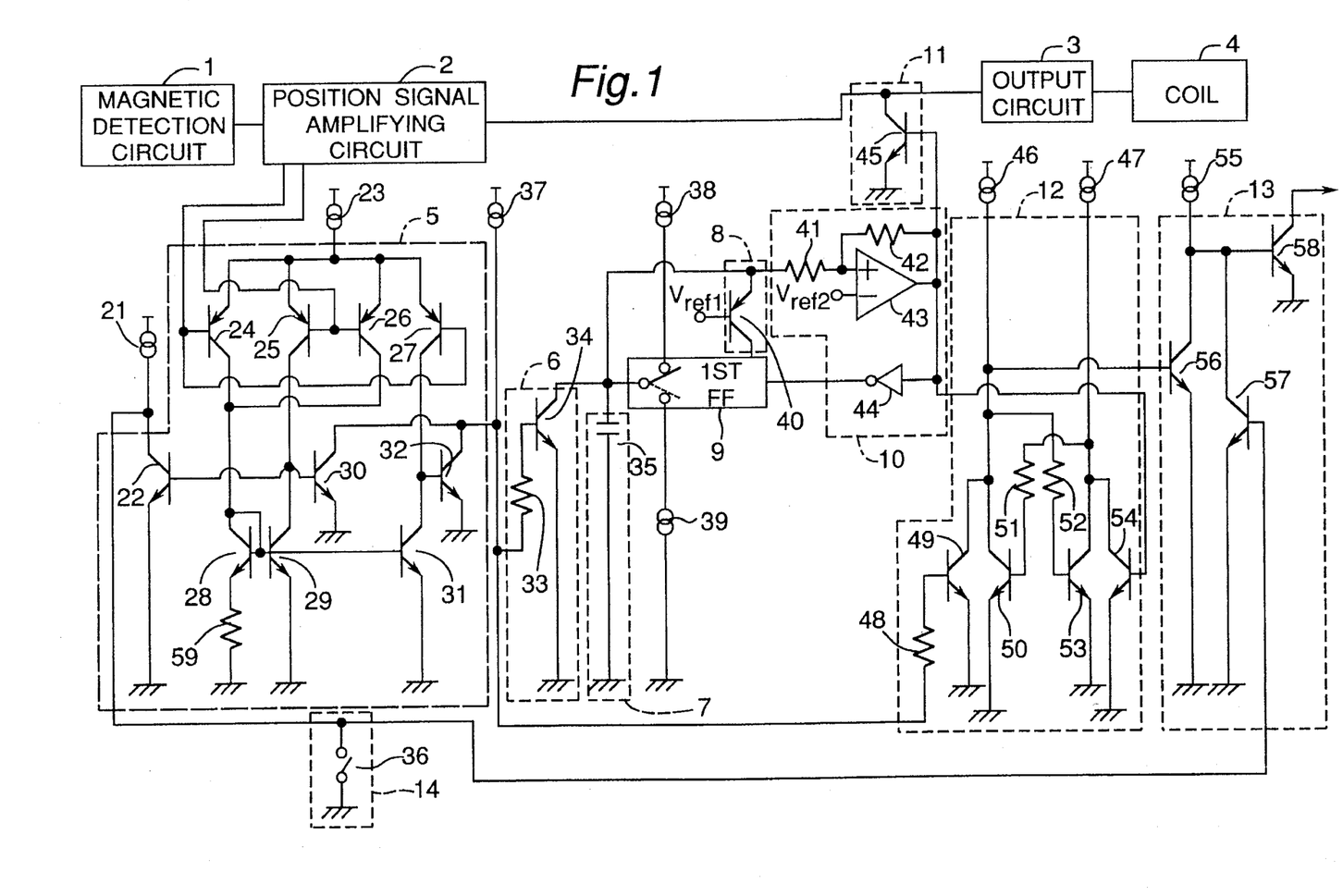
FIG. 1 is a circuit diagram of a brushless motor lock detection apparatus according to a first embodiment of the invention.

As shown in FIG. 1, a brushless motor, such as a fan drive motor, comprises a magnetic detection circuit 1, a position signal amplifying circuit 2, output circuit 3, and coil 4 for driving a rotor in the motor. The detail of the circuits 1, 2, 3 and 4 is disclosed in my related U.S. patent application Ser. No. 08/316,558 filed Sep. 30, 1994 and entitled "BRUSHLESS MOTOR DRIVE CIRCUIT" The entire content of the above related U.S. patent application is expressly incorporated by reference herein.

Figure 3A:
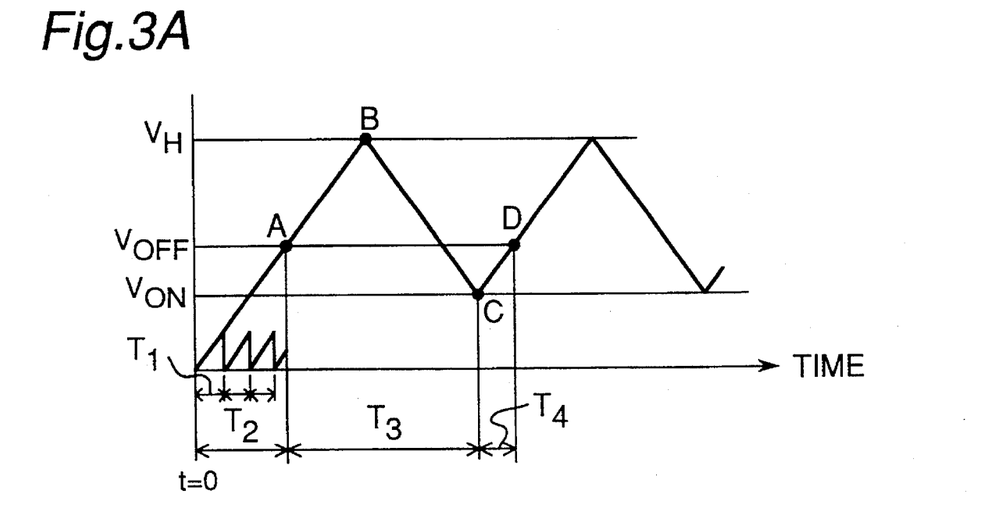
FIGS. 3A, 3B, 3C and 3D are wave form diagrams of the output signals obtained from the apparatus in FIG. 1.
Figure 3B:
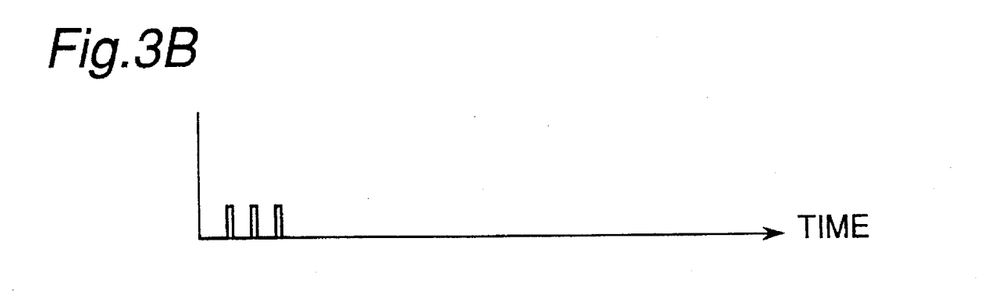

The rotation pulse generation circuit 5 comprises transistors 24, 25 and 26, 27 forming an inverse phase differential amplifier; transistors 28, 29, 31, and resistor 59 forming a current mirror circuit, which outputs a delay signal; a transistor 22 for outputting the FG signal; and transistors 30 and 32 forming a NOR circuit. The rotation pulse generation circuit 5 receives two sinusoidal input signals opposite in phase from the position signal amplifying circuit 2, and outputs an FG signal having a half-cycle a HIGH level and another half-cycle a LOW level, such as the two pulses shown in FIG. 3D, from collector of transistor 22, and also outputs a discharge pulse, such as shown in FIG. 3B. The discharge pulse is a narrow pulse produced at every zero crossing point of the received sinusoidal signal. The discharge pulse is formed by slightly shifting the phase of one of the two sinusoidal input signals, cutting off the negative side of the two sinusoidal input signals, and taking a logical NOR between the two sinusoidal input signals.

The discharge circuit 6 comprises a transistor 34 and resistor 33, and operates in response to the discharge pulse (FIG. 3B) output from the rotation pulse generation circuit 5.

The integration circuit 7 comprises a capacitor 35 for charging and dischanging a current from a first flip-flop circuit 9 as will be described later.

The integration control circuit 8 comprises a single transistor 40 with its base receiving a predetermined constant reference potential $V_{ref1}$, and outputs from its collector a first mode control signal to the flip-flop circuit 9 so as to establish a discharge mode (dotted line) when the potential of the integration circuit 7 exceeds a predetermined level $V_H$ ($=V_{ref1}+V_{BE}$).

The first flip-flop circuit 9 is connected so that the integration circuit 7 switches between the charge and discharge modes based on the output from the first flip-flop circuit 9. During the charge mode, the first flip-flop circuit 9 will be switched to the position shown by a real line in FIG. 1, and during the discharge mode, the same will be switched to the position shown by a dotted line.

A comparator circuit 10 comprises an operating amplifier 43 having its inverting input receiving a predetermined constant reference potential $V_{ref2}$, an inverter 44, and resistors 41 and 42. The comparator circuit 10 uses resistors 41 and 42 to obtain hysteresis characteristics to detect the potential of the integration circuit, and output an interrupt/reset signal. The interrupt/reset signal is applied also to the inverter 44 which then produces a second mode control signal to the flip-flop circuit 9 to establish a charge mode (real line).

An interrupt/reset circuit 11 includes a transistor 45 to which the comparator circuit output, i.e., the interrupt/reset signal, is applied, and which thus controls, through the output circuit 3, whether the current supply to the coil 4 is interrupted or maintained.

A second flip-flop circuit 12 comprises transistors 49, 50, 53, and 54, and resistors 48, 51, and 52. The interrupt/reset signal from the comparator circuit 10 is also applied to the second flip-flop circuit 12, so that the second flip-flop circuit 12 maintains the state established by the interrupt/reset signal until a new rotation pulse is applied to the base of transistor 49 from the rotation pulse generation circuit 5.

A lock detection circuit 13 comprises transistors 56 and 57, and output transistor 58. The lock detection circuit 13 outputs a HIGH level signal (or a LOW level signal when PNP, instead of NPN, transistor is used for transistor 58) when the motor is locked, and outputs an FG signal or LOW (or HIGH) level signal depending on a switching circuit 14 when the motor is properly running, based on the output of transistor 57.

A switching circuit 14 comprises a manually operable switch 36 for controlling the output of transistor 57 such that during proper motor running period, the lock detection circuit 13 outputs an FG signal when switch 36 is turned off or LOW (or HIGH) level signal when switch 36 is turned on.

Constant current sources 21, 23, 37, 38, 39, 46, 47, and 55 are also shown.

Figure 2:
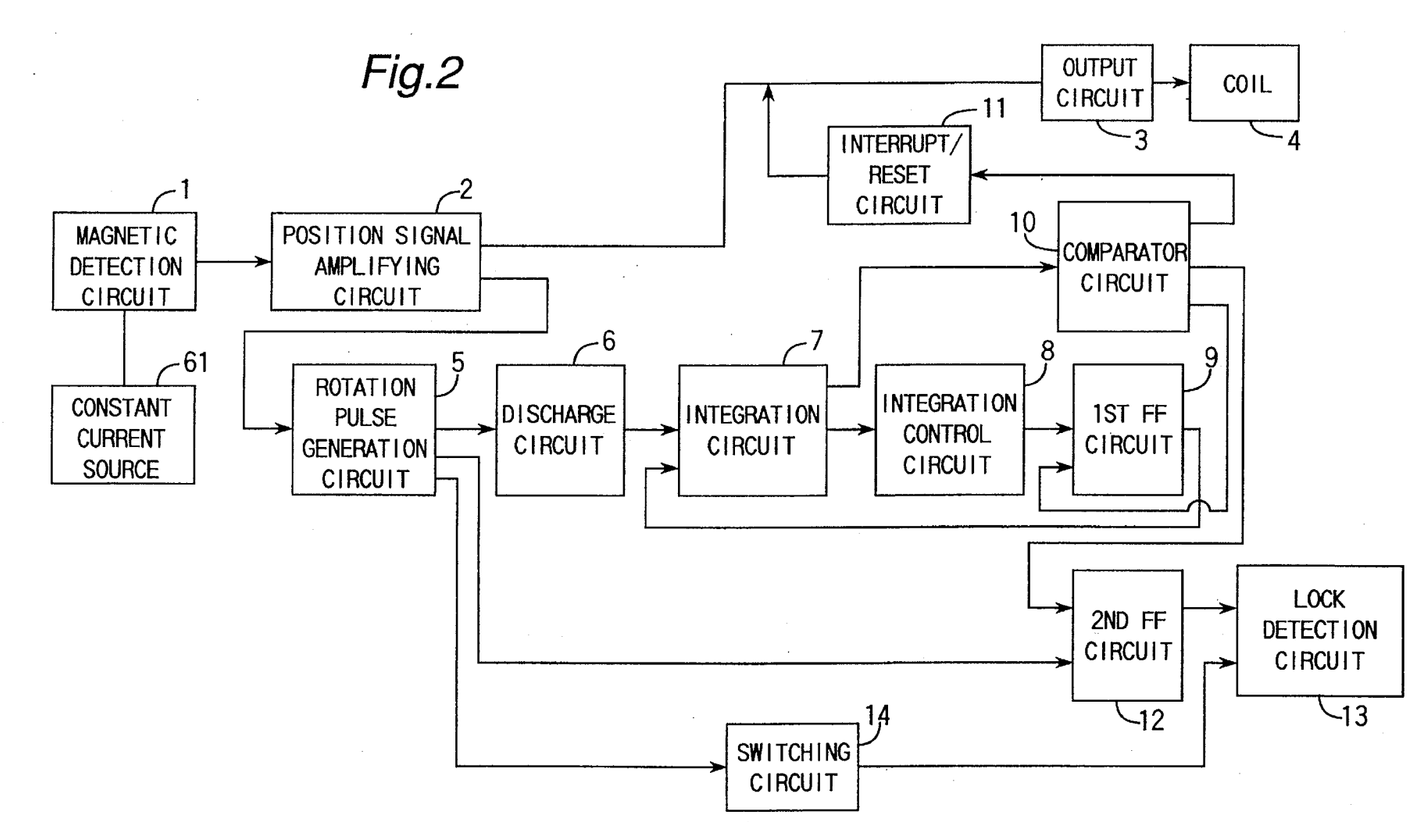
FIG. 2 is a block diagram of the brushless motor lock detection apparatus shown in FIG. 1.

FIG. 2 is a block diagram of the circuit configuration shown in FIG. 1; constant current source 61 is collectively equivalent to the plural constant current sources shown in FIG. 1.

The operation of this apparatus is described below with reference to FIGS. 3A–3D. FIG. 3A shows a graph in which abscissa represents time and ordinate represents the charged potential of the integration circuit 7, i.e., capacitor 35. At time t=0, the first flip-flop circuit 9 is initially set to the charge mode (real line) so that the capacitor 35 in the integration circuit 7 is charged by the current from a constant current source 38. When the motor is properly turning, the rotation pulse generation circuit 5 produces pulses at cycle T1, as shown in FIG. 3B, determined by the rotational speed of the motor, so that the transistor 34 in the discharge circuit 6 intermittently turns on during pulse periods, resulting in the serrated wave form, as shown in period T1. Thus, the potential of the integration circuit 7 does not rise above a predetermined level $V_{OFF}$.

On the other hand, if the motor locks up for some external reason and fails to turn from the very beginning, the rotation pulse generation circuit 5 produces no pulses or a pulse for a long time. Thus, transistor 34 is maintained off, and the capacitor 35 continues to charge current from the constant current source 38. When this potential of the capacitor 35 reaches the $V_{OFF}$ (=$V_{ref2}$) at point A, the comparator circuit 10 produces a HIGH level signal (interrupt/reset signal) which is applied to the interrupt/reset circuit 11 to turn on transistor 45. Thus, the current supply to the output circuit 3 is interrupted, and thus the coil 4 for driving the rotor will not be excited.

When the potential rises further to $V_H$=($V_{ref1}$+$V_{BE}$) at point B, transistor 40 in the integration control circuit 8 turns on to provide the first mode control signal to the first flip-flop circuit 9 so that the first flip-flop circuit 9 is switched to the discharge mode (dotted line) to provide a forcible discharge current from a constant current source 39 to capacitor 35 in the integration circuit 7. During a period from point B to point C, the capacitor 35 is discharged. When the integration circuit potential drops to $V_{ON}$ at point C, the comparator circuit 10 produces a LOW level signal which is inverted by inverter 44 to provide the second mode control signal to the first flip-flop circuit 9. Thus, the first flip-flop circuit 9 is changed to the charge mode (real line) to start charging the capacitor 35 in the integration circuit 7. Also, by the LOW level signal from the comparator circuit 10, transistor 45 in interrupt/reset circuit 11 turns off to supply current to the output circuit 3, and thus to the coil 4.

If the external factor stopping the motor has been removed at point C, the motor rotates and the pulses are generated from the rotation pulse generation circuit 5. Thus, the capacitor 35 in the integration circuit 7 will be intermittently discharged to produce serrated wave for m signal.

If, however, the external factor stopping the motor has not been removed at point C, the potential of the capacitor 35 in the integration circuit 7 again rises, and when the potential reaches the $V_{OFF}$ potential at point D, the operation described above at point A is repeated.

Figure 3C:
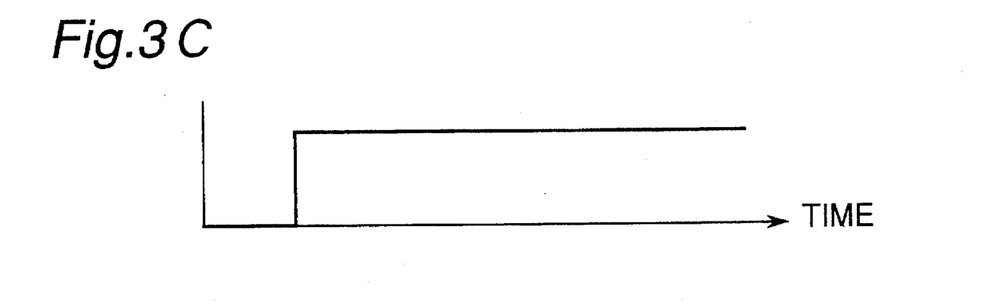

FIG. 3C shows a case in which the manually operable switch 36 is turned on. In this case, the lock detection circuit 13 outputs from the collector of transistor 58 a LOW level signal when the motor is properly turning, and outputs HIGH level signal when the motor is in the locked condition.

More specifically, when the motor is properly turning, a HIGH level pulse is applied from the rotation pulse generation circuit 5 to the base of transistor 49, causing turn off of transistor 53 and, in turn, turn on of transistor 50, resulting in the LOW level signal generation from the second flip-flop circuit 12. This state is maintained in the second flip-flop circuit 12 until transistor 54 receives a HIGH level signal to its base. Thus, by the LOW level signal from the second flip-flop circuit 12, transistor 56 turns off and, in turn, transistor 58 turns on to produce a LOW level signal from the lock detection circuit 13, indicating that the motor is properly running.

On the other hand, when the motor is in the locked condition, the rotation pulse generation circuit 5 stops supplying the rotation pulse and, in turn, the charged potential of the integration circuit 7 rises. Then, comparator circuit 10 produces a HIGH level signal when the charged potential reaches to point A ($V_{OFF}$), causing turn on of transistor 54 and, in turn, turn off of transistor 50, resulting in the HIGH level signal generation from the second flip-flop circuit 12. This state is maintained in the second flip-flop circuit 12 until transistor 49 receives a HIGH level signal to its base. Thus, by the HIGH level signal from the second flip-flop circuit 12, transistor 56 turns on and, in turn, transistor 58 turns off to produce a HIGH level signal from the lock detection circuit 13, indicating that the motor is in the locked condition.

Continuing from the above situation, even when the potential of the integration circuit 7 drops to point C ($V_{ON}$) to produce a LOW level signal from comparator circuit 10, the second flip-flop circuit 12 maintains its state without any change. This is because the second flip-flop circuit 12 changes its state from the present state only by a HIGH level signal applied to the base of transistor 49. At this point, no pulse is generated from the rotation pulse generation circuit 5.

When the external factor is then removed and the rotation pulse generation circuit 5 begins outputting the rotation pulse again, the flip-flop inverts again to the original state, and the output transistor 58 outputs a LOW level signal. As a result, even if transistor 22 of the rotation pulse generation circuit 5 outputs the FG signal when the motor is turning, only a LOW level signal is applied to the base of transistor 57 by the turn on of switch 36. Thus, the output of transistor 57 of the lock detection circuit 13 remains HIGH, and the output of the second flip-flop circuit 12 also remains HIGH.

Figure 3D:
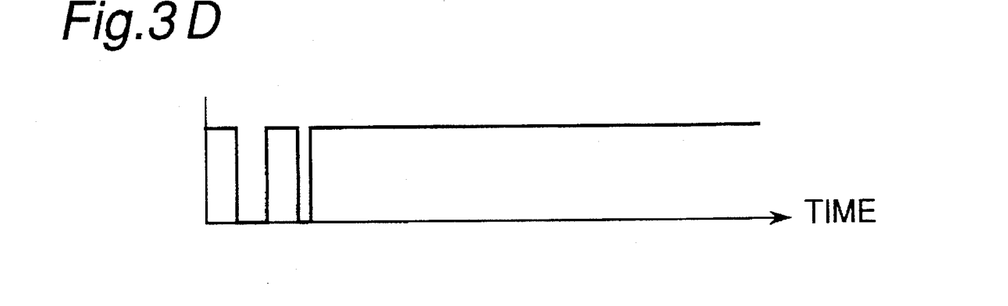

FIG. 3D shows a case in which the manually operable switch 36 is turned off. In this case, the lock detection circuit 13 outputs from the collector of transistor 58 the FG signal when the motor is properly turning, and outputs HIGH level signal when the motor is in the locked condition. The FG signal is the pulse signal, such as shown at the left end portion of FIG. 3D, having a pulse duration of T1 and pulse interval of T1.

More specifically, when the motor is properly turning, the output of the second flip-flop circuit 12 is LOW, and the FG signal output by transistor 22 of the rotation pulse generation circuit 5 is continuously output and appears as the output of the lock detection circuit 13. When the motor then locks, the output of the second flip-flop circuit 12 becomes HIGH, and the output of the lock detection circuit 13 becomes HIGH irrespective of whether the rotation pulse generation circuit transistor 22 outputs HIGH or LOW.

By manually changing the position of the switch 36 in the switching circuit 14 as described above, the output mode of the lock detection circuit 13 can be selectively switched.

Figure 4:
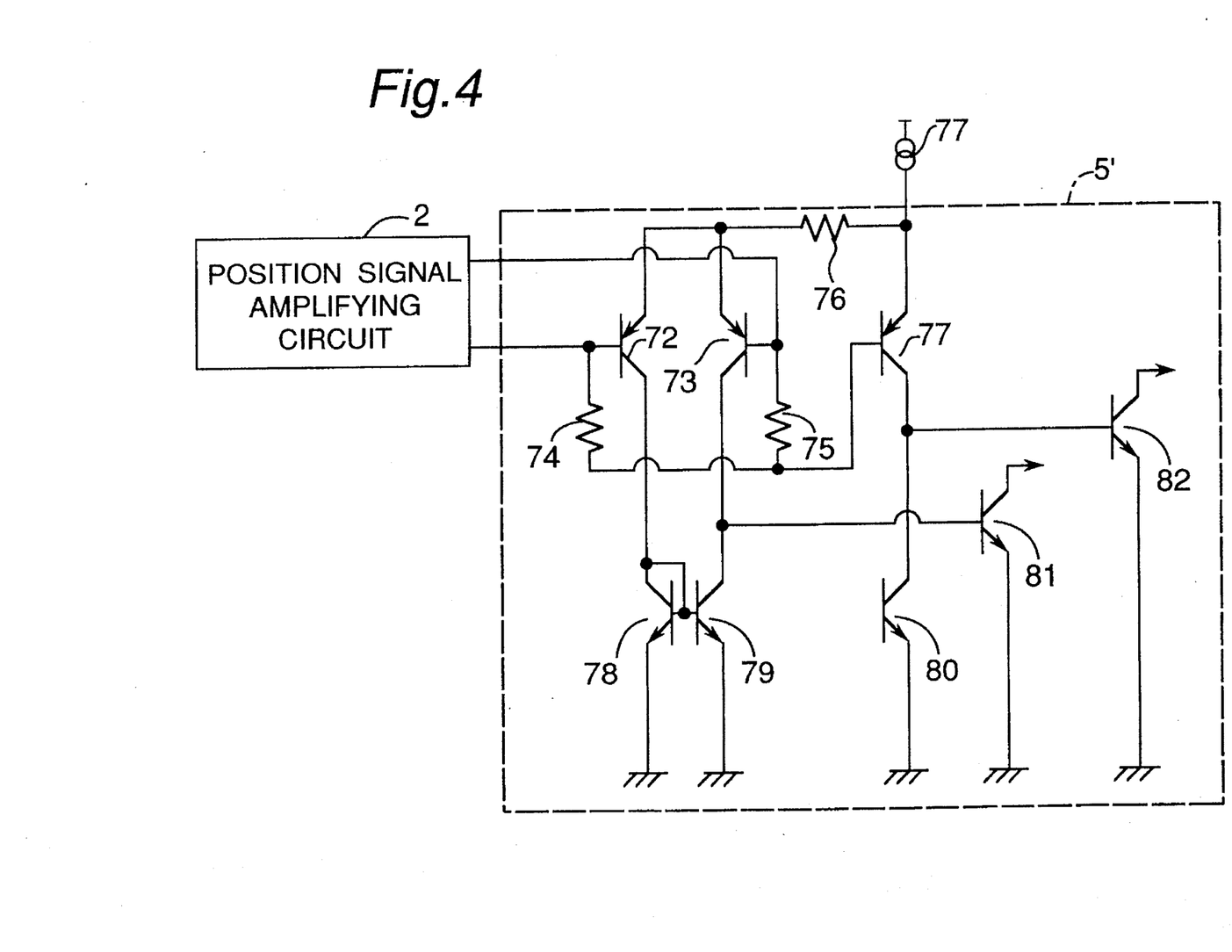
FIG. 4 is a circuit diagram of a modification of the rotation pulse generation circuit shown in the circuit of FIG. 1.

Referring to FIG. 4, a rotation pulse generation circuit 5' is shown which is a modification of the circuit 5 shown in FIG. 1. In the rotation pulse generation circuit 5', the FG signal and discharge pulse can still be simultaneously obtained. Specifically, the outputs of the position signal amplifying circuit 2 are divided by resistors 74 and 75 to obtain a reference signal at a junction between resistors 74 and 75. The outputs of the position signal amplifying circuit 2 are applied to transistors 73 and 74 which define, together with transistor 77, a differential amplifier. The reference potential is applied to transistor 77. The outputs of the differential amplifier are respectively connected to a current mirror circuit defined by transistors 78 and 79. When the output of the position signal amplifying circuit 2 is zero, a threshold current is applied by resistor 76 so that the reference potential side is output. As a result, a pulse driving the discharge circuit and an FG signal can be simultaneously output through transistor 82 from the reference potential side, and through transistor 81 from the output side, respectively. Note that transistors 81 and 82 correspond to transistors 22 and 34, respectively, in FIG. 1.

As described hereinabove, it is possible by means of the present invention to selectively output either an FG signal or LOW (or HIGH) signal when the motor is turning, and to output only a HIGH (or LOW) level signal when the motor is locked, thereby simplifying signal processing and the circuitry downstream, and reducing the number of parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brushless motor lock detection apparatus for detecting a locked condition of a rotor of a brushless motor, said apparatus comprising:

pulse generating means for generating pulses synchronized to the rotation of said rotor;

integration means for charging a current and discharging said current in response to said pulses, said integration means being continuously charged in the absence of said pulses;

first integration control means for producing a first mode control signal when said integration means is charged to a first predetermined level during the absence of said pulses; second integration control means having a hysteresis characteristics for producing a current interruption signal when said integration means is charged to a second predetermined level which is less than said first predetermined level, and also for producing a second mode control signal when said integration means is discharged to a third predetermined level which is less than said second predetermined level;

mode selection means for selectively setting either one of a charge mode during the presence of said pulses for charging said integration means, and a discharge mode during the absence of said pulses for discharging said integration means, said discharge mode being established in response to said first mode control signal, and said charge mode being established in response to said second mode control signal; and lock detection means for producing a high level signal indicative of a motor locked state starting in response to a current interruption signal and ending in response to a pulse from said pulse generating means, and for producing a pulsating signal indicative of a motor rotating state commensurate with said pulses.

2. A brushless motor lock detection apparatus as claimed in claim 1, wherein said integration means comprises a discharge circuit for discharging the charge in the integration means, during the motor being rotated, in response to each of said pulses.

3. A brushless motor lock detection apparatus as claimed in claim 1, further comprising a motor drive circuit for driving said motor, said current interruption signal interrupting a driving current to said motor drive circuit.

4. A brushless motor lock detection apparatus as claimed in claim 1, wherein said integration means comprises a capacitor.

5. A brushless motor lock detection apparatus as claimed in claim 1, wherein said second integration control means comprises an operational amplifier with a hysteresis characteristic.

6. A brushless motor lock detection apparatus as claimed in claim 1, wherein said mode selection means comprises a first flip-flop circuit which sets and resets in response to said first and second mode control signals, respectively, a first current source means for supplying said current and a second current source means for supplying said discharge current.

7. A brushless motor lock detection apparatus as claimed in claim 1, wherein said lock detection means comprises a second flip-flop circuit which sets and resets in response to said pulse and said current interruption signal, respectively, and a lock detection signal generator for generating said locked state signal in accordance with an output from said second flip-flop circuit.

8. A brushless motor lock detection apparatus as claimed in claim 1, further comprising a manually operable switch means for supplying when said switch means is turned to a first position, a predetermined level signal to said lock detection means when said motor is being rotated, and for supplying when said switch means is turned to a second position, a pulsating signal indicative of rotation of said rotor.

9. A brushless motor lock detection apparatus as claimed in claim 1, wherein said pulse generating means comprises:

a magnetic detection circuit for detecting a rotational position of the rotor and for producing a position signal; and a rotation pulse generation circuit for generating said pulses synchronized to the rotational position of the rotor.

10. A brushless motor lock detection apparatus as claimed in claim 9, wherein said rotation pulse generation circuit comprises an inverse phase differential amplifier and a current mirror circuit.

11. A brushless motor lock detection apparatus as claimed in claim 9, wherein said rotation pulse generation circuit comprises a voltage divider for dividing said position signal from said magnetic detection circuit, a differential amplifier, and a current mirror circuit.

* * * * *

UNITED STATES PATENT AND TRADE MARK OFFICE
CERTIFICATE OF CORRECTION

PATENT NO.  : 5,574,608
DATED       : November 12, 1996
INVENTOR(S) : Fukuoka

It is certified that error appears in the above-identified patent and that said Letters Patent is hereby corrected as shown below:

In column 7, line 55, "second integration..." should start a new paragraph.

In column 8, line 31, between "said" and "current" insert the word --charge--.

Signed and Sealed this

Twenty-seventh Day of May, 1997

Attest:

BRUCE LEHMAN

Attesting Officer

Commissioner of Patents and Trademarks